US008122271B1

(12) United States Patent
Schier

(10) Patent No.: US 8,122,271 B1
(45) Date of Patent: Feb. 21, 2012

(54) SYSTEM, METHOD, AND DEVICE FOR PROVIDING SECURE OPERATING ENVIRONMENTS FOR COMPUTER SYSTEMS

(75) Inventor: John E Schier, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 2381 days.

(21) Appl. No.: 09/737,679

(22) Filed: Dec. 14, 2000

(51) Int. Cl.
*G06F 1/26* (2006.01)

(52) U.S. Cl. .............. 713/324; 726/2; 726/27; 713/300; 713/310; 713/320

(58) Field of Classification Search .................. 713/300, 713/310, 320, 324, 323, 201; 709/224–229; 726/2, 27
See application file for complete search history.

(56) References Cited

U.S. PATENT DOCUMENTS

| 5,084,877 | A | * | 1/1992 | Netravali et al. ............... 714/748 |
| 5,404,544 | A | | 4/1995 | Crayford ........................ 395/750 |
| 5,495,480 | A | * | 2/1996 | Yoshida ......................... 370/389 |
| 5,675,800 | A | | 10/1997 | Fisher, Jr. et al. ............. 395/700 |
| 5,699,430 | A | | 12/1997 | Krizay et al. .................... 380/23 |
| 5,802,305 | A | | 9/1998 | McKaughan et al. ... 395/200.57 |
| 5,859,968 | A | | 1/1999 | Brown et al. .................. 295/186 |
| 5,892,901 | A | * | 4/1999 | Landwehr et al. ............. 713/200 |
| 5,983,357 | A | * | 11/1999 | Sun ................................ 713/324 |
| 5,991,279 | A | | 11/1999 | Haugli et al. .................. 370/311 |
| 6,185,616 | B1 | * | 2/2001 | Namma et al. ................. 709/227 |
| 6,193,422 | B1 | * | 2/2001 | Belt et al. ...................... 713/320 |
| 6,249,681 | B1 | * | 6/2001 | Virtanen ........................ 455/466 |
| 6,256,742 | B1 | | 7/2001 | Konaka et al. ................ 713/320 |
| 6,304,975 | B1 | | 10/2001 | Shipley ......................... 713/201 |
| 6,324,651 | B2 | | 11/2001 | Kubik et al. .................. 713/323 |
| 6,330,607 | B1 | | 12/2001 | Chmielewski et al. ....... 709/227 |
| 6,378,074 | B1 | * | 4/2002 | Tiong ............................ 713/200 |
| 6,504,534 | B1 | | 1/2003 | Takase et al. ................. 345/211 |
| 6,519,208 | B2 | | 2/2003 | DeVries ......................... 368/10 |
| 6,546,425 | B1 | | 4/2003 | Hanson et al. ................ 709/227 |
| 6,748,542 | B2 | | 6/2004 | Box ............................... 713/201 |
| 6,799,209 | B1 | | 9/2004 | Hayton ......................... 709/203 |

OTHER PUBLICATIONS

U.S. Appl. No. 09/751,850, filed Dec. 29, 2000, entitled "Method, System, and Device for Enabling Network Access for Computer Systems Based on User Input", by inventors John E. Schier, et al.
U.S. Appl. No. 09/737,679, filed Dec. 14, 2000, entitled "System, Method, and Device for Providing Secure Operating Environments for Computer Systems", by inventor John E. Schier,.

* cited by examiner

*Primary Examiner* — Michael Pyzocha
*Assistant Examiner* — Tamara Teslovich
(74) *Attorney, Agent, or Firm* — Baker Botts L.L.P.

(57) ABSTRACT

The present invention includes a system, method, and device for providing secure operating environments for computer systems. In one form, a method for providing a secure operating environment for a network accessible system is disclosed. The method includes accessing a delay timer having a delay time interval operably coupled to a communication module. The delay time interval may be compared to activity operably associated with the system communicating with the network. The communication module may be enabled in response to the comparison and in one form may be isolated if the communication port remains idle for a time period greater than the delay time interval.

19 Claims, 3 Drawing Sheets

SYSTEM, METHOD, AND DEVICE FOR PROVIDING SECURE OPERATING ENVIRONMENTS FOR COMPUTER SYSTEMS

TECHNICAL FIELD

The present invention generally relates to network communications, and more particularly to a system, method, and device for providing secure operating environments for computer systems.

BACKGROUND OF THE INVENTION

Computer systems are often subject to unauthorized access by third parties which may result in damage to the system or disclosure of personal or confidential information stored within the system. For example, violators may access a computer system and obtain a user's personal profile information such as social security number, an address, a phone number, race, sex, gender, etc. This information can then be used for further inquiry to access personal account information accessible over the Internet. For example, a third party may obtain a user's financial account information and social security number and access the user's account to monitor account activity. Information obtained by unauthorized access to a computer system may also be used to apply for credit cards, on-line accounts, on-line loans, etc. leading to undesirable cyber-criminal activity through use of the user's personal or confidential information.

SUMMARY OF THE INVENTION

In accordance with the teachings of the present invention, a system, device, and method for providing secure operating environments for computer systems are disclosed. According to one aspect of the invention, a method for providing a secure operating environment for a network accessible system is provided. The method includes accessing a delay timer including a delay time interval operably coupled to a communication module. The delay time interval is compared to an activity associated with the system communicating with the network. The method further includes isolating the communication module from the network based on the comparison.

According to another aspect of the invention, a system operable to communicate information via a network is provided. The system includes means for accessing a delay timer operably coupled to a communication module. The delay timer includes a delay time interval and the system includes means for comparing the delay time interval to an activity associated with the system communicating with the network. The system further includes means for isolating the communication module from the network based on the comparison.

According to another aspect of the invention a medium including encoded logic for providing a secure operating environment is disclosed. The medium includes logic operable to access a delay timer coupled to a communication module. The delay timer includes a delay time interval. The medium further includes logic operable to compare the delay time interval to an activity associated with the system communicating with the network and to isolate the communication module from the network based on the comparison.

According to another aspect of the invention, a device operable to provide a secure operating environment for accessing a network is disclosed. The device includes a communication module operable to communicate information via the network and a delay timer operably coupled to the communication module. The delay timer includes a delay time interval operable to enable communication between the communication module and the network.

It is a technical advantage of certain embodiments of the invention to provide a secure operating environment for computer systems that may be connected to networks such as the Internet. In one embodiment, connection to the network may depend on communication initiated by the system. The system may be connected to a network via a communication module, such as a cable modem, DSL modem, or other modem and a delay timer may be used to remove power and/or disconnect the communication module upon determining an inactive or idle period longer than the delay time interval. The delay time interval may be set by the manufacturer of the module and/or computer system and updated using a software or hardware interface.

It is another technical advantage of certain embodiments of the invention to provide an operating mode for a communication module that is transparent to a user. A communication module may be connected to a network based on detecting user activity and a power state for the communication module may be altered based upon the activity. Upon altering the power state the communication module may initiate communication with the network. As such, a computer system may appear to remain connected to the user while the system remains isolated from the network during inactive periods allowing a user to access a network without having to reconnect after a period of inactivity has isolated the communication module from the network. Through disconnecting and reconnecting power to the communication module, the computer system allows for periods of inactivity by the user and isolates the computer system from the network thereby reducing undesired third party access to the computer system during inactive network accessing periods. Additionally, through periodically isolating and enabling the communication module from the network, power consumption of the system may be reduced and efficient utilization of bandwidth for communication networks may be increased.

Other technical advantages are readily apparent to one skilled in the art from the attached figures, description, and claims.

DETAILED DESCRIPTION OF THE INVENTION

A system, method, and device for providing secure operating environments for computer systems are disclosed. In one form, the system includes a communication module for communicating with a network such as the Internet and a delay timer coupled to the communication module for isolating the communication module from the network. The delay timer includes a delay time interval having a value (i.e. ten seconds, two minutes, etc.) that may be set or programmed using a hardware or software interface. In one embodiment, the delay timer may be used to isolate the communication module from the network upon the communication module being idle for a period greater than the delay time interval. Isolation may include disabling a communication module by providing a reduced power state for the communication module, disconnecting a communication port to the network, disconnecting a data bus associated with communicating information from the communication module to the computer system or other embodiments for isolating the communication module. In this manner, undesirable access to a computer system by a third party may be obviated during periods of reduced user interaction with the network.

Figure 1:
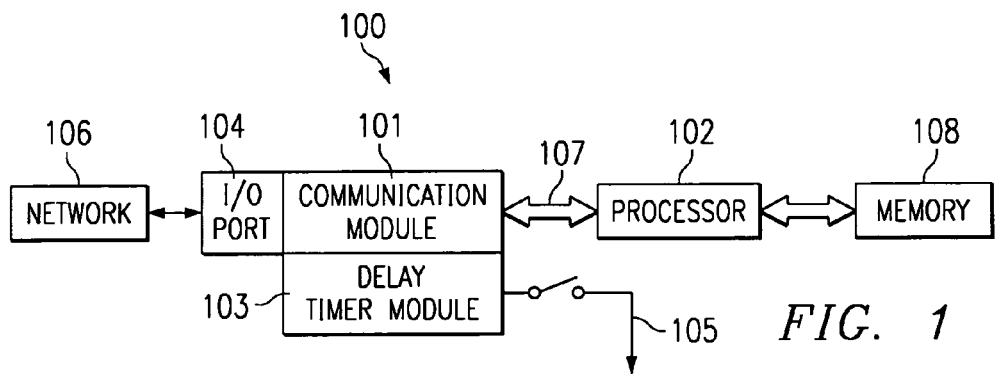
FIG. 1 illustrates one embodiment of a device for providing secure operating environments for computer systems.

FIG. 1 illustrates a device for providing a secure operating environment for a computer system. A system, illustrated generally at 100, includes a communication module 101 operably coupled to a processor 102 via data bus 107. Communication module 101 includes a communication port 104 for communicating with a network 106 and a delay timer 103 that includes a delay time interval for determining a period of inactivity between network 106 and system 100. Communication module 101 includes power interconnect 105 providing a power state for communication module 101. For example, power interconnect 105 may be implemented as hardware, such as a relay, switch, etc. or as a soft switch operable to alter a power state for communication module 101.

A power state may include reducing the communication module to a "power on" state without allowing communication with processor 102 and/or network 106. Such a "power on" state may allow communication module 101 to be in an idle state thereby reducing initialization sequences that may be required during an operating state. Other power states may also be realized by the present invention. Though illustrated as separate components, system 100 may be integrated into a single electronic device that may employ software operable to provide a secure operating environment and may be integrated in whole or in part as a system-on-a-chip, RISC device, embedded processor, etc.

During use, system 100 communicates with network 106 via communication module 101. System 100 monitors activity between communication module 101 and network 106 and, upon an inactive period (e.g. communication module remains idle) exceeding the delay time interval for delay timer module 103, system 100 may isolate communication module 101 by altering its power state. For example, interconnect 105 may be deactivated thereby removing a ground potential for communication module 101. In another embodiment, system 100 may isolate communication module 101 from network 106 by disconnecting communication port 104 from network 106. For example, communication port 104 may include a data buffer (not expressly shown) for communicating information between communication module 101 and network 106. As such, access between the data buffer may be removed upon the delay time interval being exceeded. Other embodiments may include system 100 isolating communication module 104 by disabling communication of information using data bus 107 communicatively coupled to communication module 101 and processor 102.

Delay timer module 103 may be set or programmed to a desired delay time interval by the manufacturer of system 100, communication module 101, and/or delay timer module 103. For example, a hardware interface, such as a timer, dipswitch, etc. may be preset by the manufacturer to a value of ten minutes. As such, neither a user nor a third party may access the delay timer 103 setting without accessing the hardware interface and physically reconfiguring delay timer module 103 for a different delay time interval value.

In another embodiment, delay timer module 103 may be realized as a software parameter embedded within system 100 and accessible only by the user of system 100. For example, the user may access delay timer module 103 using a user interface (not expressly shown) coupled to system 100 and not via network 106. As such, a third party may not access delay timer module 103 via network 106 and reprogram the parameter to a new value. Other embodiments for changing the delay time interval for delay timer module 103 may include providing limited access using authentication such as a password, a serial number, and/or a unique identifier for communication module 101, system 100, communication port 104 or other components of system 100. In this manner, a user may reset delay timer module 103 using system 100 or a network administrator and/or manufacturer having network access to system 100, passwords and/or serial numbers may reprogram or re-set delay timer module 103 to a new value for the delay time interval.

In one embodiment, system 100 monitors communication between communication module 101 and network 106 through determining user initiated or requested communication of information. For example, communication module 101 may employ software operable to communicate using TCP/IP communication protocols. As such, packets of information originating from a network location may be communicated to system 100 and upon the final packet from a network location being received, delay timer module 103 may initialized to indicate a period of inactivity with network 106 has begun. In one embodiment, delay timer module 103 may initialized based upon user interaction with a system 100 for network specific activities.

For example, a user may compose an email using a network hosted email software application. As such, an extended period of inactivity between the network location hosting the email application and the user may exceed the selected delay time interval for delay timer module 103. As such, system 100 would isolate communication module 101 from network 106 and store the current network location reference within memory 108. Upon the user finishing composing the email, system 100 may enable communication module 101 and use the location reference stored in memory 108 to access the appropriate network location thereby allowing the user to communicate the email via network 106. In this manner, applications hosted and provided by network locations or application service providers may be accessed by system 100 over an extended period of time. Additionally, a secure operating environment for system 100 may be provided by isolating communication module 101 from network 106 for inactive periods thereby reducing network connection times while increasing bandwidth for network 106.

In another embodiment, re-establishing access to network 106 may be limited to a user interacting with system 100. For example, communication module 101 may be isolated due to an excessive inactive period. Re-establishing a network connection may be selectively initiated through a user interacting with an interface associated with system 100. The interface may include a keyboard, a mouse, a pointing device, a touchpad, hotkeys, graphical icons, softkeys, graphical user interfaces, etc. As such, a third party may not deploy a script which may have been copied to system 100 and operable to be deployed at a later date and time. For example, a third party may copy a script to a storage media coupled to system 100 and, at a predetermined time, the script may be activated such that system 100 will initialize communication module 101 allowing a third party to access system 100. By requiring a user to interact with system 100 via a selected interface, deployment of such scripts local to system 100 may be prevented thereby providing a more secure operating environment for system 100.

Figure 2:
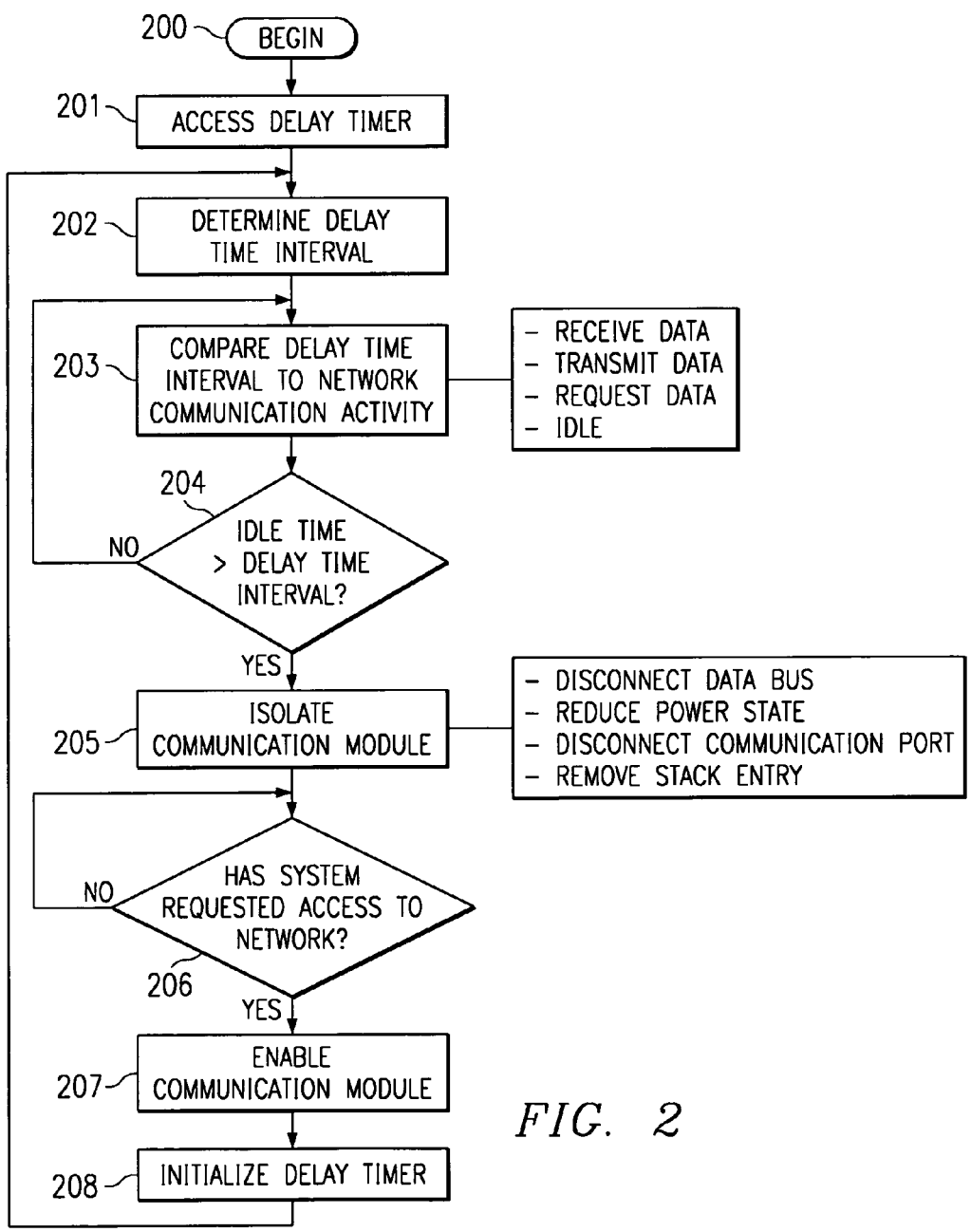
FIG. 2 illustrates one embodiment of a flow diagram of a method for providing a secure operating environment.

FIG. 2 illustrates one embodiment of a flow diagram of a method for providing secure operating environment. The method may be used by the system illustrated in FIG. 1 or other systems, methods, or devices incorporating teachings of the invention.

The method begins at step 200. At step 201, the method accesses a delay timer operably coupled to a communication module. For example, a delay timer may be a hardware setting or a software parameter stored within memory accessible by a system. A delay time interval associated with the delay timer is determined at step 202. At step 203 the delay time interval is compared to activities associated with the communication module while communicating with the network. For example, a date/time value associated with the most recently received or requested information via the network may be determined. As such, at step 203 the delay time interval is compared to the selected activity of the communication device. If at step 204, the idle time for the communication module is less than the delay time interval, the method proceeds to step 203 and repeats.

If at step 204, the communication device has been idle for a time period longer than the delay time interval, the method proceeds to step 205 where the communication module is isolated. In one embodiment, the method may isolate the communication module from the network through disconnecting the communication module from the network. In another embodiment, a power state associated with the communication module may be reduced to isolate the communication module from the network. Other embodiments may also be used to isolate the communication module from the network such as removing stack memory entries, disconnecting communication ports, etc.

Upon isolating the communication module, the method proceeds to step 206 where a communication request from the system to the network is detected. For example, a user may interact with the system to access a network location such as a web site. Other embodiments may include a user selecting a function button such a forward button, home button, button, etc. located within network browser software operable to allow a user to navigate a network such as the Internet. Upon detecting a requested communication, the system enables the communication module at step 207. Such enablement may include restoring the power state of the communication module to an operating state, initializing the communication module, enabling an I/O port for the communication module or other embodiments. For example, the communication module may train or synchronize communication with the communication module and a network.

Upon enabling the communication module, the method then proceeds to step 208 where the delay timer is initialized and to step 202 where the method repeats. In this manner, a disconnection and reconnection of the communication module to a network may be transparent to the user while a secure operating environment for computer systems is maintained.

Figure 3:
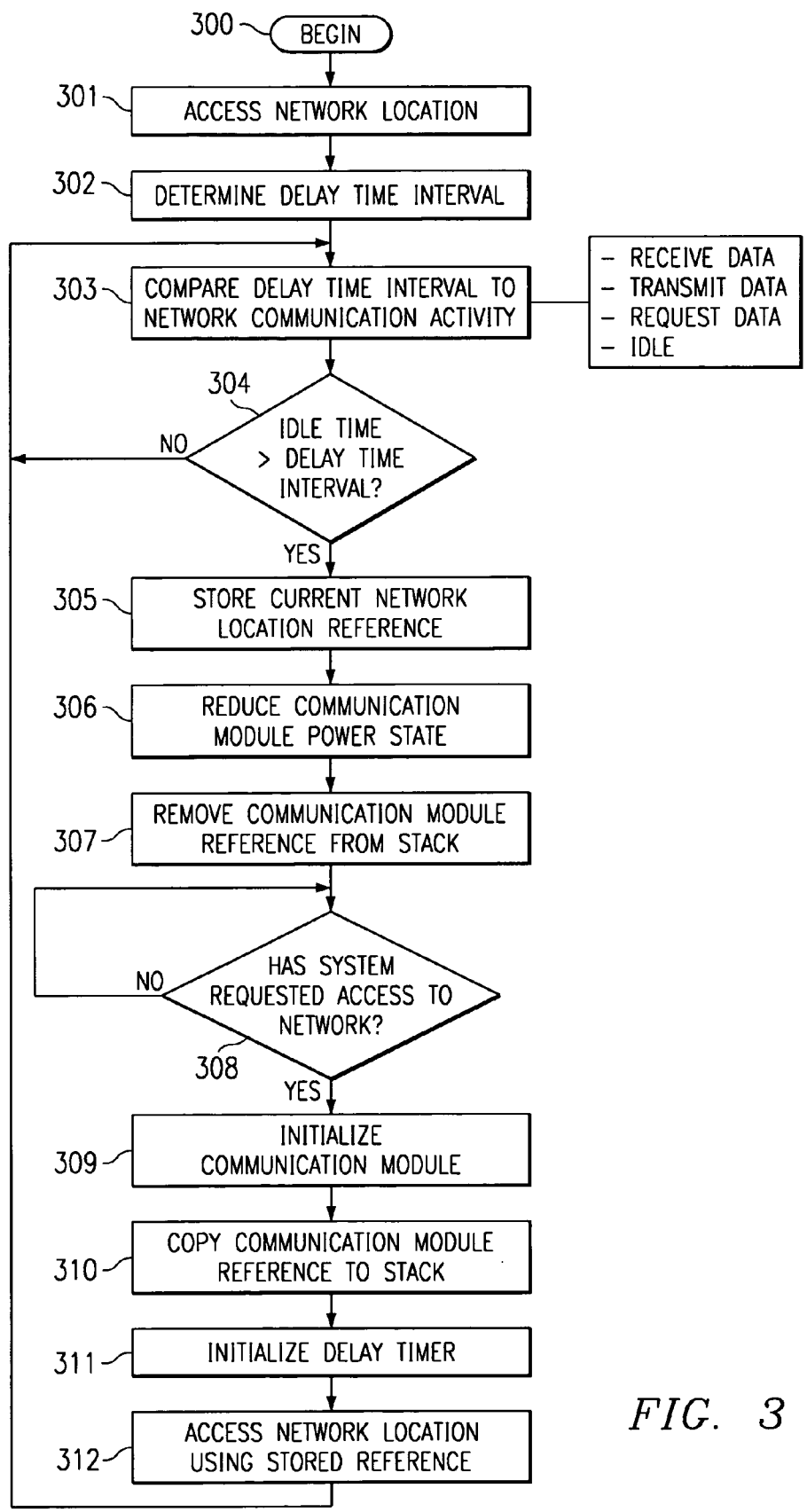
FIG. 3 illustrates one embodiment of a flow diagram of a method for providing a secure operating environment based on user interaction with a computer system.

FIG. 3 illustrates another embodiment of a flow diagram of a method for providing a secure operating environment. The method begins at step 300. At step 301, a system connected to a network accesses one or more network locations. The system communicates with the network via a communication module such as DSL modem, cable modem, etc. The method then proceeds to step 302 where a delay time interval for a delay timer is determined. For example, the delay time interval may include a value (e.g. five minutes) for the maximum amount of time the communication module may remain idle before exceeding the delay time interval.

At step 303, the method determines the most recent network activity associated with communicating with the network and compares the delay time interval to the most recent activity at step 304. If the activity is less than the delay time interval, the method proceeds to step 303 and repeats. If at step 304 the method determines that the delay time interval has been exceeded, the method proceeds to step 305 where the method stores the current network location reference (e.g. network address) within memory. The method then proceeds to step 306 where a power state for the communication module is reduced to a level such that the communication module is isolated from the network.

Upon reducing the power state, the method proceeds to step 307 where a communication reference associated with the communication module is removed from the stack. For example, a reference may be loaded onto a stack operable to store communication references to layers (i.e. TCP, IP, etc.) through which data passes between a system and a server via a network. The stack may include a data area, memory area, buffer, etc. for storing references for communicating with a network. As such, at step 307 the communication module reference or references for the communication module is removed from the stack and the method proceeds to step 308 where the method determines if a user initiated request to access the network is detected. For example, a user may access a network hosted application and upon utilizing the application for an extended period of time (e.g. greater than the delay time interval), the user may want to communicate information via the network using the network hosted application. As such, upon the user requesting access to the network the method proceeds to step 309 where the communication module is initialized and to step 310 where a reference identifying the communication module is copied to the stack.

The method then proceeds to step 311 where the delay timer associated with the communication module is initialized and to step 313 where the network accesses the requested network location or determines the previous network location using the stored network reference of the most previously accessed network location. In this manner, the system may disconnect and reconnect based on the delay time interval without the user having to manually re-establish a connection with the network.

Figure 4:
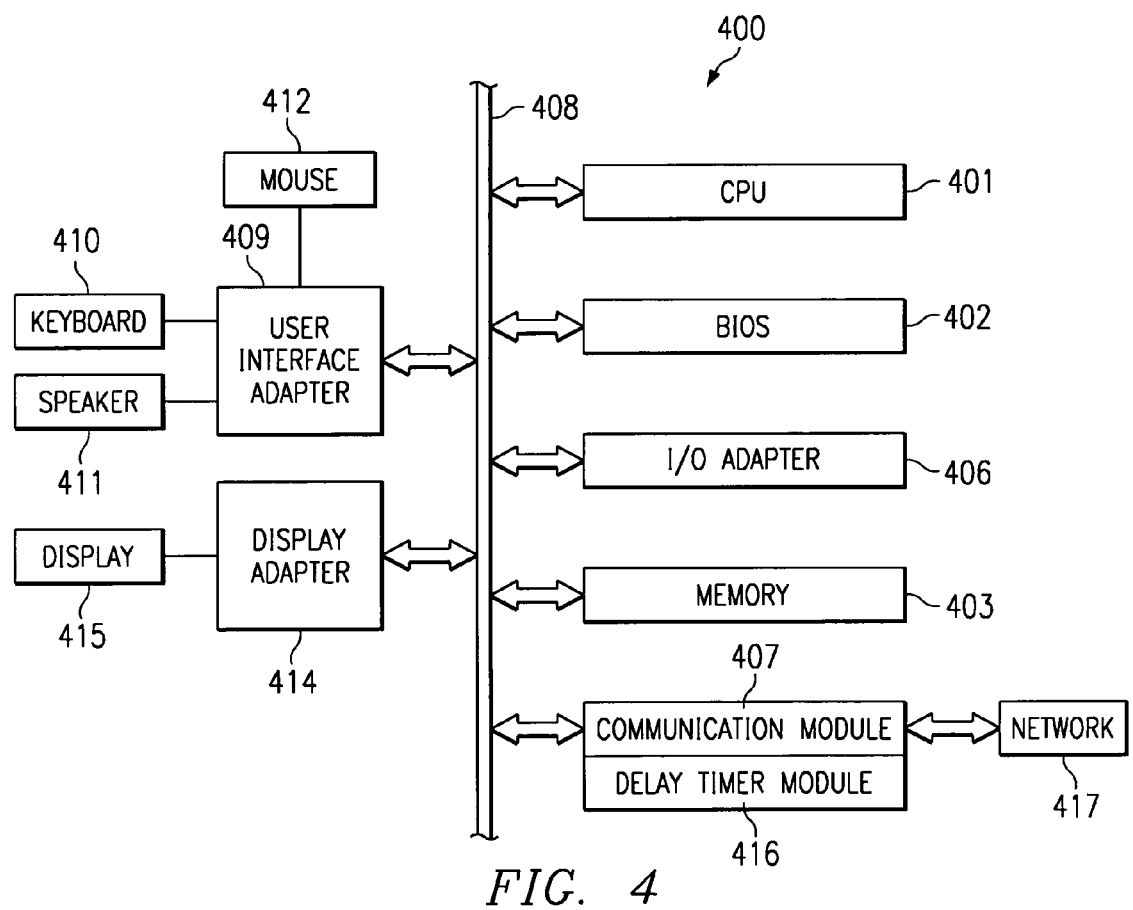
FIG. 4 illustrates one embodiment of a computer system operable to access a communication network via a secure operating environment.

FIG. 4 illustrates one embodiment of a computer system operable to access a communication network via a secure operating environment. FIG. 4 illustrates a block diagram of a computer system incorporating one embodiment of the present invention. Other systems may also be used and may include a personal digital assistant (PDA), a wireless handheld device, a wireless telephone, a portable computer, a server, or other devices operable to interact with a network.

A system, indicated generally at 400, includes a central processing unit (CPU) 401 connected via at least one bus 408 to a basic input output system (BIOS) firmware 402, and memory, such as RAM, ROM, EEPROM, and any other memory devices, collectively designated by reference numeral 403. System 400 further includes an input/output adapter 406 for connecting peripheral devices such as SCSI drives, RAID drives, and a display adapter 414 for connecting a display device 415 such as a Flat Panel Display (FPD) or a Cathode Ray Tube (CRT). A user interface adapter 409 is provided for connecting a keyboard 410, a mouse 412, a speaker 413 and/or other user interface devices such as game controllers, touch pads, etc. System 400 also includes a communications module 407 and a delay timer module 416 for connecting system 400 to an information network 417 such as an Intranet or the Internet. Computer system 400 is coupled to communication module 402 via data bus 403.

During use, computer system 400 communicates with network 417 via communication module 407. System 400 may monitor information communicated between communication module 407 and network 417 using processor 401 and, upon an inactive period (e.g. communication module remains idle) exceeding the delay time interval for delay timer module 416, communication module 407 may be isolated from network 417 by altering a power state of communication module 407. For example, on power supply interconnect for communication module 407 (not expressly shown) may be deactivated thereby removing a ground potential for communication module 407. In another embodiment, communication module 407 may be isolated by disconnecting a communication port to network 417. For example, communication module 407 may include a data buffer (not expressly shown) for communicating information between communication module 407 and network 417. As such, access between the data buffer may be removed upon the delay time interval being exceeded. Other embodiments may include isolating communication module 407 by isolating data bus 408 for communication module 407. In this manner, computer system 401 may be isolated from network 417 during idle periods and undesirable access to a computer system 401 may be prevented during periods of reduced network activity.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing a secure operating environment for a network accessible system comprising:
   accessing a communication module, the communication module including a delay timer including a delay time interval;
   comparing the delay time interval to an activity associated with the system communication with the network the activity being any communication between the system and the network;
   isolating the communication module from the network based on the comparison without terminating all power supplied to the communication module;
   accessing a network location;
   enabling the communication module upon determining a request to access the network location;
   storing a network reference operable to identify the network location;
   removing a communication module reference from a memory stack associated with the communication module, the communication module reference associated with enabling the communication module;
   disabling the communication module upon the communication module remaining idle for a time period greater than the delay time interval; and
   copying the communication module reference to the memory stack upon detecting a request by the system to access the network location.

2. The method of claim 1, further comprising disabling the communication module if the communication module remains idle for a time period greater than the delay time interval.

3. The method of claim 2, wherein the disabling includes reducing a power state associated with the communication module.

4. The method of claim 3, further comprising:
   detecting a user initiated request to access the network;
   altering the power state of the communication module;
   initializing the communication module to communicate with the network; and
   initializing the delay timer.

5. The method of claim 1, wherein the isolating further comprises disconnecting a communication port associated with the communication module.

6. The method of claim 1, further comprising initializing the delay time in response to the system initiating communication with the network.

7. The method of claim 1, further comprising adjusting the delay time interval using a software interface associated with a delay timer.

8. The method of claim 1, further comprising adjusting the delay time interval using a hardware interface associated with the delay timer.

9. The method of claim 1, further comprising:
   locating a reference within a memory associated with the delay timer, the reference operably associated with enabling the communication module; and
   removing the reference in response to the communication module being idle for a time period greater than the delay time interval.

10. A non-transitory medium comprising encoded logic for providing a secure operating environment for a network accessible system comprising:
    access a communication module, the communication module including a delay timer including a delay time interval;
    compare the delay time interval to an activity operably associated with a system communicating with a network, the activity being any communication between the system and the network;
    isolate the communication module and the delay timer from the network based on the comparison without terminating all power supplied to the communication module;
    access a network location;
    enable the communication module upon determining a request to access the network location;
    store a network reference operable to identify the network location;
    remove a communication module reference from a memory stack associated with the communication module, the communication module reference associated with enabling the communication module;
    disable the communication module upon the communication module remaining idle for a time period greater than the delay time interval; and
    copy the communication module reference to the memory stack upon detecting a request by the system to access the network location.

11. A device operable to provide a secure operating environment for accessing a network comprising:
    a communication module operable to communicate information via the network;
    the communication module including a delay timer;
    the delay timer including a delay time interval and operable to disable communication between the network and the communication module with the delay timer without terminating all power to the communication module in response to a comparison of the delay time interval to any communication through the communication module;

a processor;

a storage device embodying a program of instructions operable, when executed on the processor, to:

access a network location;

enable the communication module upon determining a request to access the network location;

store a network reference operable to identify the network location;

remove a communication module reference from a memory stack associated with the communication module, the communication module reference associated with enabling the communication module;

disable the communication module upon the communication module remaining idle for a time period greater than the delay time interval; and copy the communication module reference to the memory stack upon detecting a request by the system to access the network location.

12. The device of claim 11, further comprising:

a data bus coupled to the communication module and the processor; and the data bus operable to communicate information based on the delay time interval.

13. The device of claim 11, further comprising the delay time interval programmed via an interface associated with the delay timer.

14. The device of claim 13, further comprising the delay timer interval programmed using the delay time interval reference and the communication module reference.

15. The device of claim 11, further comprising a power state operably associated with the delay timer and the power state operable to provide power to the communication module.

16. The device of claim 11, further comprising:

a communication port communicatively coupling the communication module and the network; and the communication port operable based on the delay time interval.

17. The method of claim 1, wherein the network implements a TCP/IP transport language protocol.

18. The non-transitory medium of claim 10, wherein the network implements a TCP/IP transport language protocol.

19. The device of claim 11 wherein the network implements a TCP/IP transport language protocol.

* * * * *